United States Patent [19]
Bangs

[11] 3,756,566
[45] Sept. 4, 1973

[54] PORTABLE ELECTRIC CATTLE GUARD

[76] Inventor: Albert Bangs, 7408 N.E. 133 Ave., Vancouver, Wash. 98662

[22] Filed: July 31, 1972

[21] Appl. No.: 276,840

[52] U.S. Cl. .............................................. 256/10
[51] Int. Cl. .......................................... A01k 3/00
[58] Field of Search .................... 256/1, 10, 14, 17; 49/131, 132, 58, 59

[56] References Cited
UNITED STATES PATENTS

| 2,512,740 | 6/1950 | Evans | 49/131 X |
| 2,769,617 | 11/1956 | Hutchinson | 256/10 |
| 2,899,174 | 8/1959 | Wells | 256/10 |

*Primary Examiner*—Dennis L. Taylor

[57] ABSTRACT

An electric guard device for placement between gate posts. This device consists primarily of wire stretched between tubing and includes insulators, collapsable feet, chain means for fastening the device to the fence posts, and a power unit for supplying current to the wire.

4 Claims, 5 Drawing Figures

PATENTED SEP 4 1973 3,756,566

PORTABLE ELECTRIC CATTLE GUARD

This invention relates to electric fences, and more particularly to a portable electric cattle guard.

It is therefore the primary purpose of this invention to provide a portable electric cattle guard device which will be secured between the fence post where a gate is located, the device serving to prevent cattle and other animals from passing between the gate opening when it is open.

Another object of this invention is to provide a cattle guard device of the type described which will be of such structure, so as to enable vehicles to easy pass over it at any speed and the device will put shock to an animal without maining or otherwise hurting the animal.

A further object of this invention is to provide a cattle guard of the type described, which will be idealy suited for farms, ranches, surburban homes, sporting lodges and other areas.

A still further object of this invention is to provide a cattle guard device of the type described, which may be used between an opening in a fence, thus preventing the necessity of needing a gate.

Other objects of the present invention are to provide a portable electric cattle guard device which is simple in design, inexpensive to manufacture, rugged in construction, easy to use and efficient in operation.

These and other objects will be readily evident upon a study of the following specification and the accompanying drawings wherein.

Figure 1:
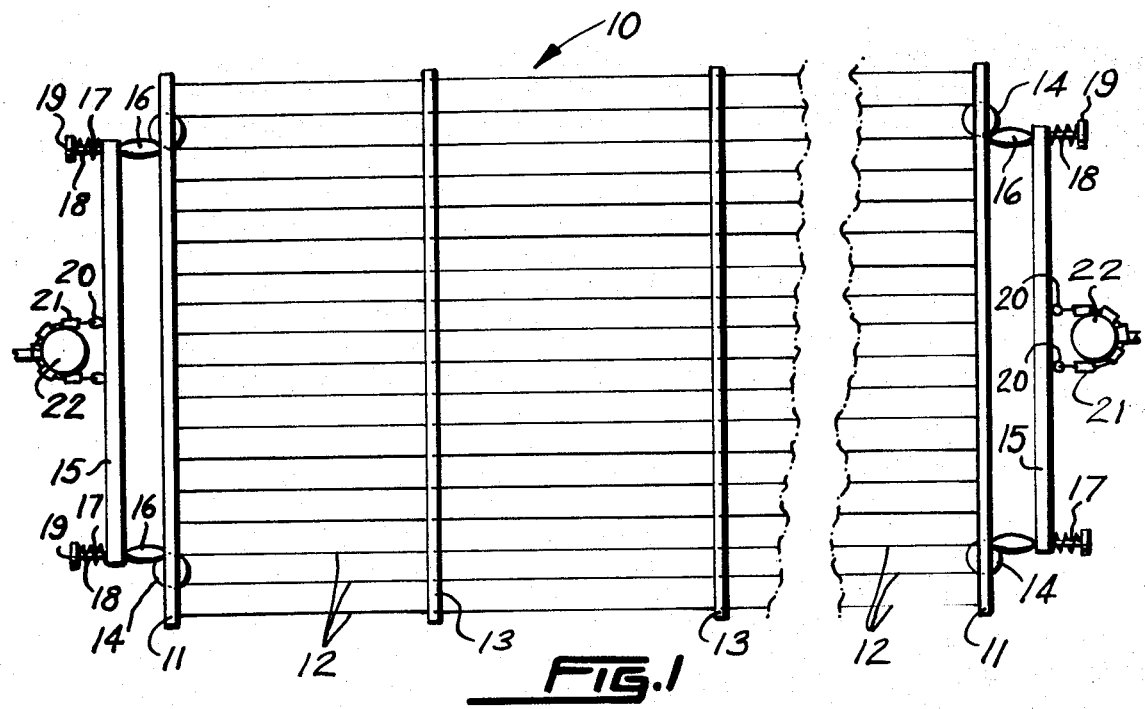
FIG. 1 is a fragmentary plan view of the present invention.

According to this invention, a portable electric cattle guard 10 is shown to include a pair of parallel spaced apart tube members 11 having secured thereto, aircraft cable 12 forming a fence like structure with cross members 13 spaced apart therein. Secured to the tubular members 11 are collapsable feet 14. Spaced apart from the tubular members 11 on the ends of guard 10, are bars 15. Carried between the tubular members 11 and the bars 15, are porcelain insulators 16. A rod 17 at each end of bar 15 carries a compression spring 18, the springs 18 being retained by the heads 19 of the rods 17.

The springs 18 of rod 17, provide a means of applying tension to the guard 10.

A pair of spaced apart eye bolts 20 are secured to the bars 15 and a chain 21 is carried by eye bolts 20 so as to secure guard 10 to the fence post 22.

A pair of end frames 23 which are collapsable, include legs 24 having feet members 25. A plurality of parallel spaced apart wires 26 are secured to the legs 24 of frames 23 and foldable bar elements 27 are secured to each other and to the legs 24, by pivot pins 28. At the top of frames 23 an adjustable rubber strap 29 is secured thereto and includes a buckle 30 for fastening straps 29 to the post 22, the frames 23, thus providing support means for the post 22.

Figure 5:
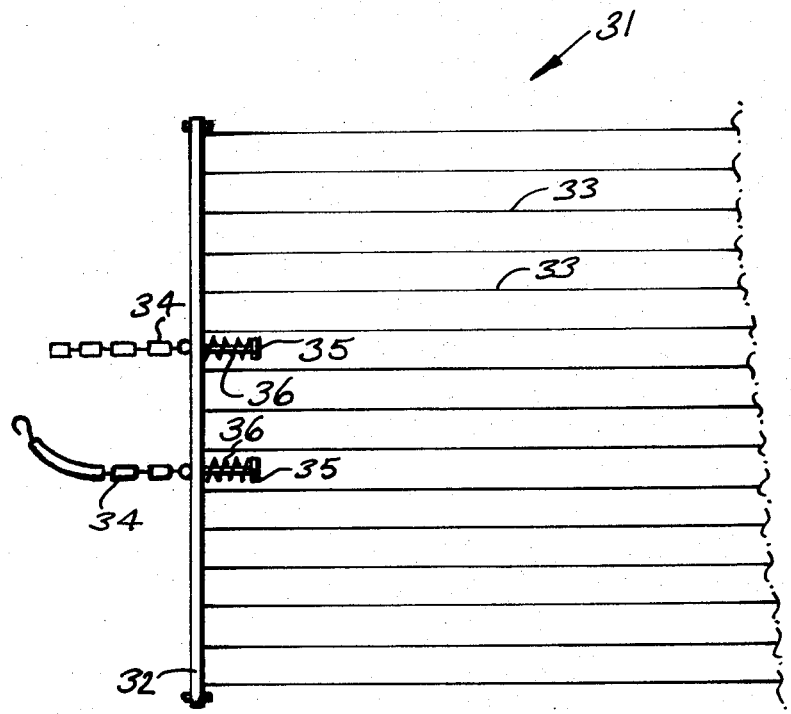
FIG. 5 is a fragmentary plan view showing a modified cattle guard for driveways.

Looking now at FIG. 5 of the drawing, one will see a cattle guard 31 for driveways. Guard 31 includes a pair of tubing members 32, (one of which is shown). Secured to tubing 32 are a plurality of parallel spaced apart aircraft wires 33. Chain members 34 are secured to rods 35 extending through tubings 32, the rods 35 including springs 36, one upon each rod 35 for providing tension for guard 31. The chain members 34 provide a means of securing guard 31 to post members (not shown).

Figure 2:
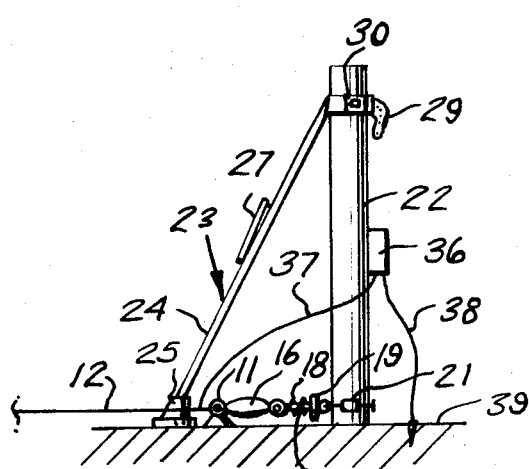
FIG. 2 is a fragmentary side view of FIG. 1 showing the power unit.
Figure 3:
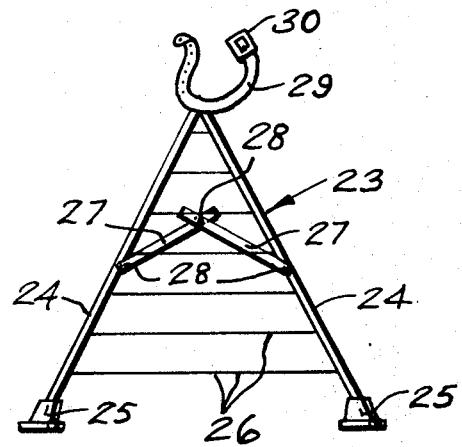
FIG. 3 is a front view of the frame attachment of the post of FIG. 2, shown in elevation.
Figure 4:
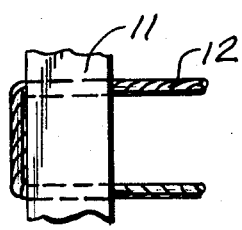
FIG. 4 is an enlarged fragmentary view showing the method of fastening the cable of the device to one of the tubular members thereof.

Referring now to FIG. 2 of the drawings, one will see an electric power unit 36 which is secured to one of the posts 22 in a suitable manner (not shown). A power unit 36 includes a wire 37 which is connected to the aircraft cable 12 and a wire 38 of power unit 36, is secured by metal spike means, within the soil 39.

In use, a power unit 36 when it is turned on, supplies current to the cable 12 so that when it is touched by an animal, it will deliver a shock to the animal thus preventing the animal from wanting to enter between the post 22.

What I now claim is:

1. A portable electric cattle guard device, comprising parallel spaced apart tubular members, a length of aircraft cable carried by said tubing providing a fence like structure with cross members for rigidity, a pair of collapsable feet members carried by said tubular members for elevating said tubular members, a pair of insulators carried by said tubular members for insulating said fence like structure from a bar member at each end of said device, rod and spring means are carried upon said bars providing tensioning means for said device, a pair of eye bolts carried by said bar members with chain means for securing said device to the fence post of a gate opening, collapsable end frame members carried by said device with pivotable bar means carried thereon and wire portions, a rubber strap carried by said frame for securing said frame to said fence post.

2. The combination according to claim 1, wherein said tubular members provide holding means for said wire members, said wire portions being carried within openings of said tubular member to thus evenly space the strans of wire apart to form said fence like structure and said cross members are parallel spaced apart and also secured to said wire members, said cross members serving to keep said parallel wire members equally spaced apart to form a flexible and foldable guard and said procelain insulators are spaced apart between said bar members, one at each end of said device.

3. The combination according to claim 2, wherein a rod member at each end of said bar members carries a compression spring, one of said ends of said compression spring urging against said bar member and the other end urging against the head of said rods, the combination providing a means of enabling said cattle guard to be stretched between said posts and eye bolts members spaced apart and secured to said bar members carries chain means for fastening said bar members of said device to said fence post and said frame members, are one each secured to said fence post.

4. The combination according to claim 3, wherein said collapsable frame members include a pair of leg members to which is secured aircraft cable in a spaced apart manner so as to form brace means between said legs and said foldable bar members of said frame are secured pivotably together at the center of said frame, the ends carrying pivot means so as to enable said legs to fold and feet means carried by said legs provides a means for said frame to rest upon the soil, said rubber strap member being adjustable by buckle means so as to be secured to fence post of various sizes and power means of said cattle guard is secured to one of said fence posts, one of said wires being secured to said aircraft wire of said cattle guard structure and the other of said wires of said power unit is secured to spike means driven into the soil so as to form ground means for said guard, said wire portions of said guard being supplied with current which will shock animals so as to prevent them from entering between said fence posts when said gate is open.

* * * * *